Jan. 10, 1933.　　　M. KUMAGAI　　　1,893,649

OIL FEEDING APPARATUS FOR INTERNAL COMBUSTION ENGINES

Filed Nov. 1, 1929

Inventor,
M. Kumagai,
by Chas. J. Williamson
Attorney

Patented Jan. 10, 1933

1,893,649

UNITED STATES PATENT OFFICE

MINORU KUMAGAI, OF OSAKA, JAPAN

OIL FEEDING APPARATUS FOR INTERNAL COMBUSTION ENGINES

Application filed November 1, 1929. Serial No. 404,093.

The present invention relates to an improved oil feeding apparatus for use in a horizontal type of an internal combustion engine comprising a lubricator with its oil pipe set through the cylinder wall and a groove formed on the upper side of the connecting rod of the crank. The object of invention is to provide an effective means for lubrication of the crank as well as piston pins of said engine with considerable saving of lubricants.

In a horizontal type of internal combustion engine the lubrication of the piston pin connecting the piston to the connecting rod is usually effected by the lubricant dropped through the oil pipe of a drop lubricator set through the cylinder wall. But as the piston pin assumes the position just below the oil pipe only twice or in other words oil is fed on said piston pin only twice during one complete revolution of the engine, a large portion of lubricant supplied will find its way outside the cylinder after part of oil being used for lubrication between the cylinder and the piston, spoiling thus the engine and its environment. Further the crank pin must be provided with a special lubricator.

In this invention such disadvantages are completely removed, the lubrication of the crank and piston pins being conducted simultaneously with a small consumption of lubricant. The oil dropping from the lubricator will be received by the piston pin when the crank reaches its outer dead point, while in any other position of stroke by a groove formed on the upper side of the connecting rod and extended with its outer end to the crank pin. In this manner the difficulty for leakage of oil can be easily overcome and complete lubrication of the crank and piston pins may be carried out.

Figure 1:
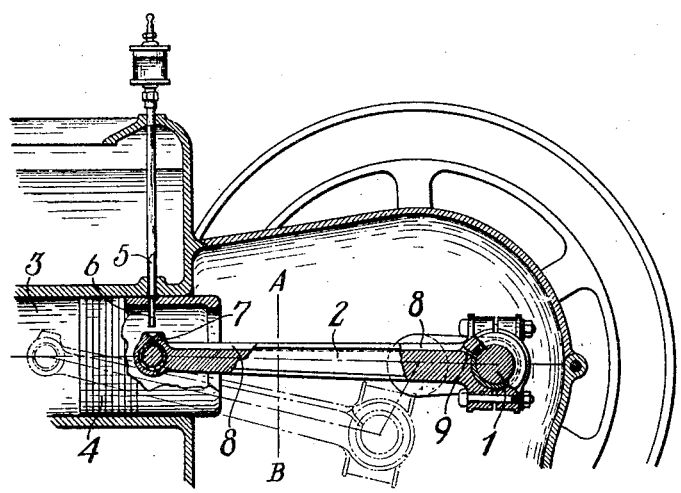
Figure 2:
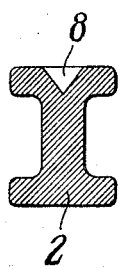

A practical example for application of this invention is represented in the accompanying drawing, in which Fig. 1 is a longitudinal section of part of the engine and Fig. 2 a longitudinal section of the connecting rod on line A—B of Fig. 1.

The invention will now be described with reference to the drawing. On the upper surface of the piston (4) which makes a reciprocating motion within the cylinder (3) by the connecting rod (2) connected with its other end to the crank shaft (1) a port (6) is arranged through the piston wall which coincides with the feed pipe (5) of the lubricator at the outer dead point of said crank shaft and opens right above the oil-hole (7) formed in the connecting rod and leading to the piston pin. The connecting rod is provided on its upper side with one or more grooves (8) communicating at its outer end with the oil-hole (9) which opens on the crank pin (1).

Thus during the reciprocating motion of the piston the piston pin will be lubricated with oil supplied from the feed pipe (5) through the port (6) and the oil-hole (7) every time when the piston momentarily comes to a standstill at the outer dead point, while in any other position of the piston oil from the feed pipe will drop onto the groove (8) and flow gradually along said groove towards the crank shaft by the swinging motion of the connecting rod and enter the oil-hole (9) lubricating thus the crank pin.

I claim:—

In a lubricating system for engines, the combination of a horizontal engine cylinder, a piston in the cylinder, a crank, a piston pin, a solid connecting rod between crank and pin, an oil cup in communication with a passage through the top wall of the cylinder situated at one end of the piston stroke, a hole in the piston that registers with the cylinder passage at such end of the stroke, a hole leading through the connecting rod above the piston pin and alining with said piston hole at said end of the stroke, and an upwardly open longitudinal channel in the upper side of the connecting rod terminating short of said hole in the connecting rod and leading to a hole passing inward to the crank, said channel being situated to pass below the passage in the cylinder wall during the stroke of the piston and to receive lubricant passing downward through such passage and convey it to the hole leading to the crank.

MINORU KUMAGAI.